United States Patent [19]

de Souza

[11] Patent Number: 5,430,953

[45] Date of Patent: Jul. 11, 1995

[54] APPARATUS FOR DETECTING OR MEASURING MOVEMENTS IN GEOLOGICAL FORMATIONS AND OTHER MASSIVE STRUCTURES

[75] Inventor: Euler M. de Souza, Kingston, Canada

[73] Assignee: Queen's University at Kingston, Kingston, Canada

[21] Appl. No.: 19,539

[22] Filed: Feb. 18, 1993

[51] Int. Cl.⁶ .............................................. G01B 5/30
[52] U.S. Cl. ..................................... 33/787; 33/1 PT
[58] Field of Search .......... 33/1 H, 1 N, 1 HH, 1 PT, 33/534, 624, 787, 790, 503, 1 M

[56] References Cited

U.S. PATENT DOCUMENTS

| 997,989 | 7/1911 | Glickert | 33/534 |
|---|---|---|---|
| 4,044,473 | 8/1977 | Crask | 33/1 N |
| 4,249,314 | 2/1981 | Beck | 33/1 PT |
| 4,472,883 | 9/1984 | Ortega | 33/1 H |
| 4,486,955 | 12/1984 | Fisher et al. | 33/1 PT |

FOREIGN PATENT DOCUMENTS

| 2701394 | 7/1978 | Germany | 33/1 H |
|---|---|---|---|
| 159296 | 9/1962 | U.S.S.R. | 33/1 H |

Primary Examiner—Cuchlinski, Jr., William A.
Assistant Examiner—G. Bradley Bennett
Attorney, Agent, or Firm—Richard J. Hicks

[57] ABSTRACT

Apparatus for detecting or measuring movements in geological and other formations and capable of carrying out such measurements on a three-dimensional basis. The apparatus has a housing acting as a support and an elongated arm, e.g., a stiff measuring rod of adjustable length, projecting from the housing and acting as a movement following element. One end of the rod is secured within the housing by sliding and pivoting connections so that the remote end of the rod may move freely in three dimensions relative to the housing. Three movement sensors are positioned within the housing. A first one of the sensors measures translational motion of the rod in the axial direction. A second sensor measures rotation of the rod about the pivot in a first plane. A third sensor measures rotation of the rod about the pivot in a second plane which intersects the first plane at right angles. The first movement sensor is preferably a linear potentiometer and the second and third sensors are preferably rotary potentiometers. The signals from the sensors may be subjected to mathematical transformations for conversion to spatial positions of the remote end of the rod, making it possible to detect and measure three-dimensional ground displacements.

11 Claims, 6 Drawing Sheets

```
        POINT 1

X: 1.0143      E:  997.0515
Y: 5.1842      N:  2002.7948
Z: 0.4306      EL: 3003.4037

DATE: 020693
TIME: 5.000
```

FIG. 7A

```
        POINT 2

X: 0.8595      E:  995.7332
Y: 6.8937      N:  2003.2688
Z: 0.8595      EL: 3004.4844

DATE: 020693
TIME: 9.0000
```

FIG. 7B

```
DX: -0.1548        DE:  -1.3183
DY:  1.7095        DN:   0.4740
DZ:  0.4290        DEL:  1.0806

RATE X:  0.0387    RATE E:   0.3296
RATE Y: -0.4274    RATE N:   0.3296
RATE Z: -0.1072    RATE EL: -0.2702
```

FIG. 7C

```
DISTANCE: 1.7693
OVERALL RATE: -0.4423
```

FIG. 7D

APPARATUS FOR DETECTING OR MEASURING MOVEMENTS IN GEOLOGICAL FORMATIONS AND OTHER MASSIVE STRUCTURES

BACKGROUND OF THE INVENTION

I. Field if the Invention

This invention relates to apparatus for detecting or measuring movements in geological formations or other massive structures. More particularly, the invention relates to apparatus of this kind that can be used by mining engineers, geologists, construction engineers and the like to assess strains and movements in rock, building foundations and other fabricated structures.

II. Description of the Prior Art

Apparatus of this kind is used primarily for monitoring geological formations. The monitoring of such structures plays an important and necessary role in mining and in the practice of tunnelling, underground and surface excavation engineering. As part of an overall project design, instrumentation is required to improve economy and safety during the excavation development phase. A number of instruments are used in the geotechnical and mining industries to provide information about ground behaviour before, during and after excavation development. Such mining and geotechnical instrumentation typically uses electrical, vibrating wire, mechanical, hydraulic and optical systems as measuring principles. The most common rock mechanics instruments used in industry include extensometers, convergence meters, strain gauges, inclinometers, tiltmeters, crack/joint meters, stressmeters, strain cells, pressure cells, load cells, microseismic sensors and piezometers.

Most of these instruments are used to monitor ground behaviour in two dimensions. In order to overcome this limitation, users install multiple instrumentation stations and resolve data in three dimensions. Such installations are expensive and, in many applications, unfeasible.

Thus, despite the large number of instruments already available, there is still a need for apparatus that can measure rock movement in three dimensions and is nevertheless inexpensive to manufacture.

Similar problems exist for construction engineers involved in the monitoring of building foundations or massive construction projects. There is therefore a need for such apparatus in these fields.

OBJECTS OF THE INVENTION

An object of the invention is to provide an apparatus for detecting and/or measuring movements of rock or manmade structures, which apparatus is capable of operating in three dimensions.

Another object of the invention is to provide apparatus of this type that can be manufactured relatively inexpensively.

Another object of the invention is to provide apparatus of this kind that can be surface-mounted or used within a rock bore or other cavity as an extensometer or the like.

Yet another object of the invention is to provide a method of measuring in three dimensions movements in geological formations or the like using a single movement detector device.

SUMMARY OF THE INVENTION

The present invention provides an apparatus for detecting movement in geological formations and other massive structures. The apparatus comprises a support and an arm pivotally and slidably connected to the support at one end to permit longitudinal extension and rotation of the arm in three dimensions relative to the support. The arm is also provided with a second end remote from the support. A first sensing means for sensing movement of the remote end of the arm in an axial direction of the arm relative to the support is provided, as well as second sensing means for sensing rotational movement of the arm about the first end in a first plane, and third sensing means for sensing rotation of the arm about the first end in a second plane which intersects the first plane at right angles. The first, second and third sensing means generate signals that, in combination, indicate the position of the remote end of the arm relative to the support at any given time.

The apparatus of the present invention may be manufactured relatively inexpensively, especially then potentiometers are use as the movement sensors, and is nevertheless capable of measuring movements accurately in three dimensions.

The invention also relates to a method of detecting and/or measuring movements in rock or other structures using apparatus of the above kind.

BRIEF DESCRIPTION OF THE DRAWINGS

FIGS. 7A, 7B, 7C and 7D are examples of a display of information about the position of the remote end of the arm, as produced by a computer using data from the sensors.

DETAILED DESCRIPTION OF THE INVENTION

Preferred embodiments of the invention are described below as used for monitoring rock formations. It should be understood, however, that the same apparatus may be used for detecting or measuring movements in other massive structures, such as building foundations, civil engineering projects and the like.

Figure 1:
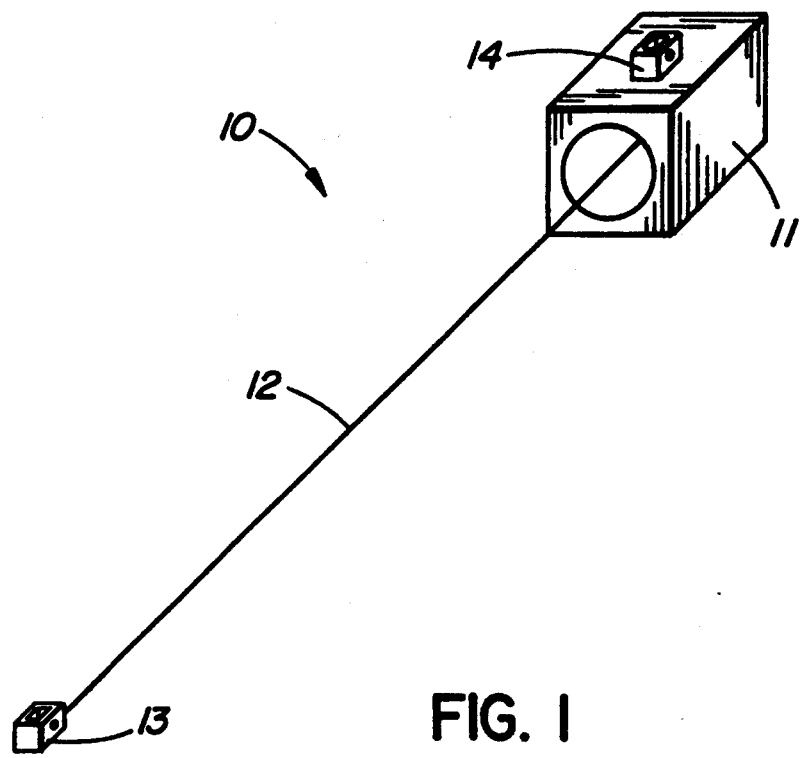
FIG. 1 is a simplified perspective view of an apparatus according to a preferred embodiment of the invention.

FIG. 1 illustrates one form of a preferred apparatus 10 according to the present invention. The apparatus includes a housing 11 and a stiff elongated manipulator arm, as a metal measuring rod 12, of adjustable length projecting from the housing through an enlarged opening and acting as a rock movement-following element. The housing forms a support for the inner (first) end of the rod, but permits free movement of the opposite or outer (second) end over a considerable range. The remote end of the rod is provided with an anchor 13, which can be attached directly to rock or to a rock bolt or anchor, to move with the rock to which it is attached. The anchor 13 acts as an "end effector," i.e., a reference point for the end of the rod. The housing 11 is also provided with an anchor 14 for secure attachment of the housing directly to rock or a rock bolt or anchor, thus causing the housing 11 to move with the rock to which it is fastened.

Once the anchors have been attached to rock surfaces, relative movement between the anchors causes the remote end of the rod 12 to move relatively to the housing 11 and this movement is detected and used to indicate movements within the supporting rock mass.

Figure 2:
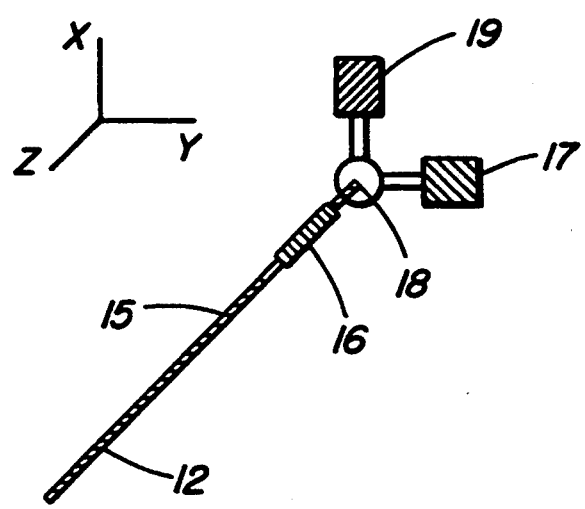
FIG. 2 is schematic representation illustrating the arrangement of the arm and sensing means of the apparatus of FIG. 1.

As shown in FIG. 2, the inner end 15 of the rod 12 is associated within the housing 11 with a series of three movement sensors. A first sensor 16 measures translational movement of the rod 12 in the longitudinal axial direction (direction Z of the orthogonal axes shown in FIG. 2). A second sensor 17 measures rotation of the second end of the rod about pivot point 18 in a first plane X-Z and a third sensor 19 measures rotation of the inner end of the rod in a second plane Y-Z arranged at right angles to the first.

Figure 3:
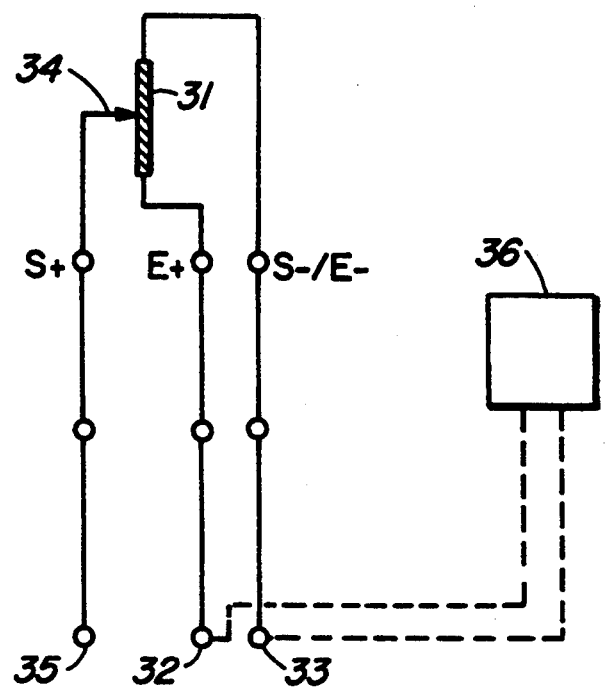
FIG. 3 is a circuit diagram showing an example of the sensing means used in the present invention.

The first sensor is preferably a linear potentiometer and the second and third sensors are preferably rotary potentiometers. Potentiometers of this kind are reliable and inexpensive and require simple analog circuitry. FIG. 3 shows a circuit diagram of a simple potentiometer 30 suitable for use in the apparatus. A resistor coil 31 is connected to a suitable power supply (not shown) via terminals 32 and 33. A movable connector 34 slides over the resistor coil according to translational or rotational movements of the arm 12. The measured voltage is supplied via terminal 35 to a voltmeter or to a data acquisition system 36 (e.g. electronic computer means and a display device). This design is suitable for each of the three sensors 16, 17 and 19. In such a case, the three sensors would give independent signals (S+), but could employ a common excitation signal (E+). However, if desired, other motion detectors, e.g., those based on transducers or capacitors, could be used for the sensors instead of potentiometers and digital circuitry could be employed instead of analog circuitry.

Figure 4:
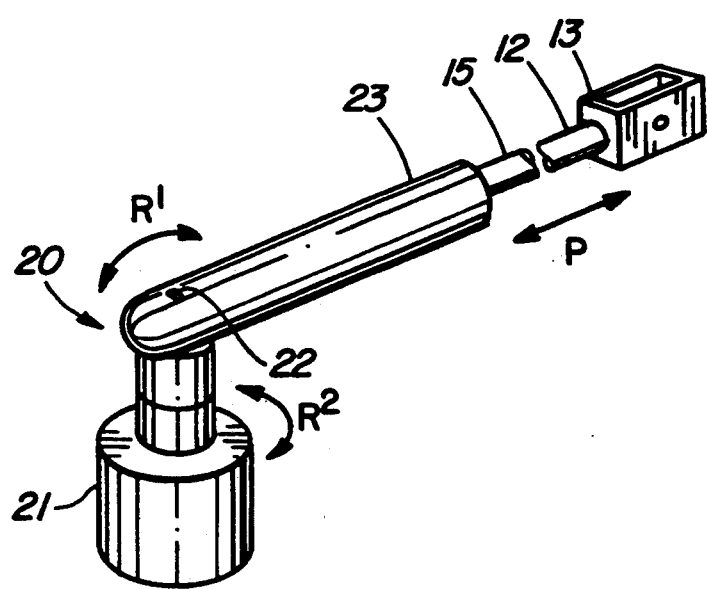
FIG. 4 shows how the arm of the apparatus of FIG. 1 may be pivoted to permit the desired movement.

The inner end 15 of the rod 12 is connected to the interior of the housing 11 by joint mechanism 20, shown in more detail in FIG. 4, creating pivot point 18 mentioned above. In this mechanism, an upright pivot pin 21 allows rotation in the direction $R^1$ as shown by the arrow and a horizontal pivot pin 22, itself mounted on pivot pin 21, permits rotation in the direction $R^2$ as shown by the arrow. These pins each form revolute (pivotal) joints. A telescoped sliding joint 23 allows for translational movement of the rod 12 in the direction P and forms a prism (sliding) joint. The joint mechanism 20 thus allows for the free movement of the remote end of the rod mentioned above. The sensors 16, 17 and 19 are operatively connected to the moving elements of the joint 20 (e.g. by methods known for the construction of joysticks) and they produce analog signals that vary according to the relative positions of these elements.

Figure 5A:
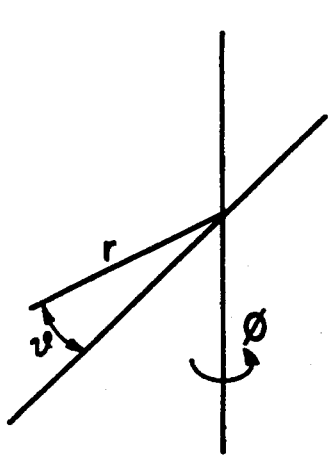
FIGS. 5A, 5B and 5C are diagrams showing how the angles and distance measured by the sensing devices of FIG. 2 can be converted into spatial coordinates.

The manner in which the signals from the sensors may be used to detect and measure the movements of the remote end of the rod 12 relative to the housing are explained below with reference to FIGS. 5A, 5B and 5C. A spherical polar manipulator geometry is used which, as indicated above, includes the two revolute (pin) type joints 21, 22 and one prism (slider) type joint 23. These joints move in directions forming a partial sphere. The working geometry of the rod is a partial sphere and the principal variables are $\theta$ (rotation), $\phi$ (rotation perpendicular to the plane of $\theta$) and r (reach or radius), as shown in FIG. 5A. The values $<\theta,\phi,r>$ can be transformed to orthogonal values $<x,y,z>$ as follows:

$$x = r' \sin \theta$$

$$y = r' \cos \theta$$

$$z' = r \cos \phi$$

$$r' = r \cos \phi$$

$$r^2 = x^2 + y^2 + z^2$$

The position of the end of the rod 12 from the housing 11 is the factor to be determined. More particularly, the location of the joint mechanism 20 is known and it is desired to compute the location of the end effector 13 relative to the inner end 15 of the rod, i.e., where the remote end of the rod is at a particular point in time relative to the housing. A coordinate system is created for the joint mechanism 20 at the inner end of the arm and position vectors are expressed in terms of this coordinate system.

Figure 5B:
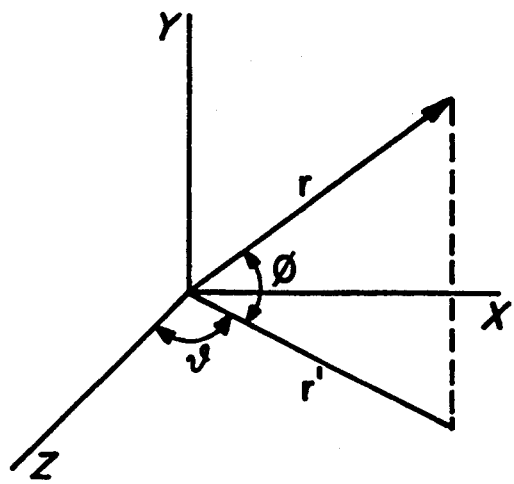
Figure 5C:
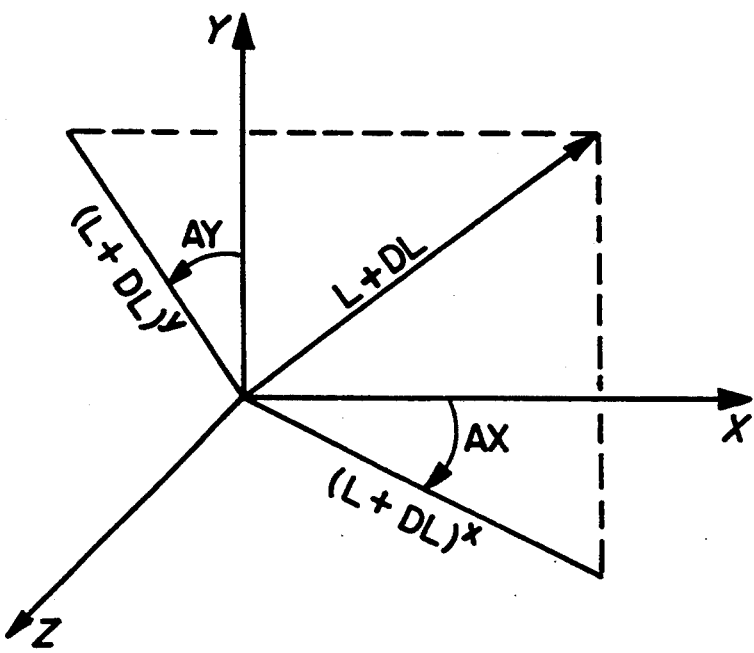

Referring to FIGS. 5B and 5C, if L is the length of the arm, DL the arm extension, AX the angle of the projection of the arm on the X-Z plane, measured counterclockwise (right-hand system) from the positive sensor X-axis and AY the angle of the projection of the arm on the Y-Z plane, measured clockwise (right-hand system) from the positive sensor Y-axis, then the relative position of the end effector in the sensor coordinates frame can be obtained as follows:

$$FX = (L+DL)^* \cos(90-AY)^* \cos(AX) \quad (1)$$

$$FY = (L+DL)^* \cos(AY) \quad (2)$$

$$FZ = (L+DL)^* \cos(90-AY)^* \sin(AX) \quad (3)$$

Voltage output from potentiometers 17 and 19 can be converted into angles AX and AY using calibration factors (degrees/volt), and voltage output from linear potentiometer 16 can be used to calculate DL.

If desired, the position vectors can be converted into a mine coordinate frame (eastings, northings, elevation) using homogeneous transformations in three dimensions. Transformation of the relative position of the end effector into mine coordinates (absolute position) can be made by the conventional Denavit-Hartenberg formulation.

A computer system may be used if desired to reduce the analog signals to engineering units. A computer system may also be used to process and display the transmitted instrument data in graphic form for quick visual inspection. Data interpretation may used to show trends in rock mass or structural behaviour giving the user the basic information required for operational control during production to check safety and to prevent accidents.

For example, the following software systems may be developed for computerized interpretation of the signals from the apparatus.

A first software system reads data from two input files. A first input file contains information concerning the position of the instrument in global coordinates: joint location (easting, northing and elevation), azimuth and dip of the instrument z axis, and the initial length of the arm. This information is determined during installation of the instrument. The second input file contains information concerning the position of the manipulator arm: the arm extension, DL, the angle of the arm with the X-axis, AY, and the date and time. The extension DL is obtained from the voltage output from the linear potentiometer, and the angles AX and AY are obtained from the voltage output from rotary potentiometers 17 and 19.

Equations (1)–(3) above are used to calculate the relative position of the end effector in instrument coordinates (x,y,z) and homogeneous transformations in three dimensions are used to convert to global coordinates (easting, northing, elevation). This information is stored in an output file. A second output file is also generated containing information concerning the movement of the manipulator over time. The following parameters are determined and stored in this data file: the difference in x, y and z values, the change in easting, northing and elevation, the overall vector and the rate of change of the vector components and of the overall vector.

A post processor program may be used to display the transmitted instrument data in three-dimensions to facilitate visual inspection. The system gives the user the ability to produce multiple views, elevations, perspectives and dynamic viewing. This feature facilitates data interpretation and engineering decision concerning the design and operational control of a project.

Figure 6A:
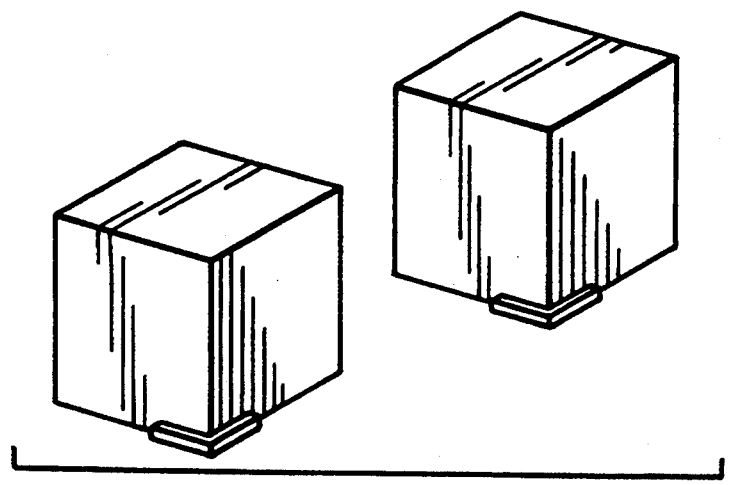
FIGS. 6A, 6B, 6C and 6D are examples of a display produced by a computer used to analyze data from the sensors.
Figure 6B:
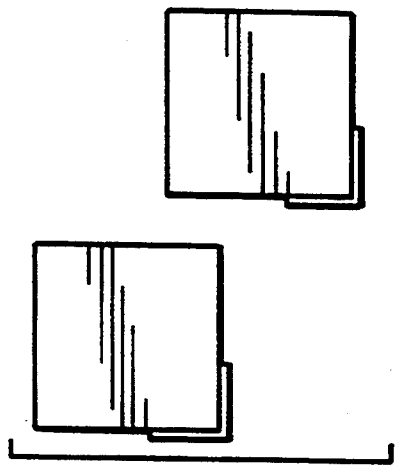
Figure 6C:
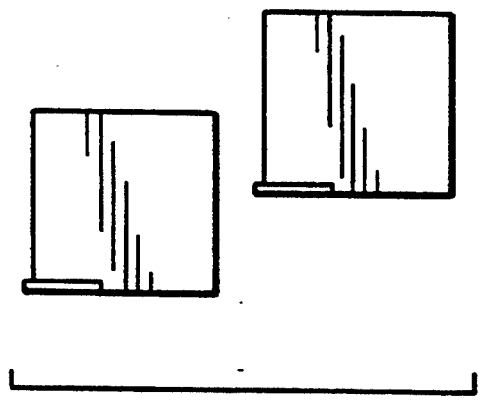
Figure 6D:
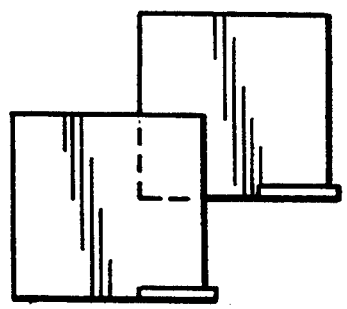

The program uses the two output files produced by the data reduction software described above. Three functions are developed for user interface. The "check function" calculates the position of the end effector at each specific sampled time and draws a cube on a graphic screen to represent the manipulator arm at each different position defined in the input data file. The program first reads the initial and time related arm extension information from the input files, then for each time value calculates the position of the end effector, inserts a cube block at the appropriate coordinate, zooms in the extent of the drawing and shades the cube in the current view port. The cube block has two attributes defined to it, the date and the time. The shaded cube has one corner preferably shaded in a color such as red, which represents the actual location of the arm's end effector. Four view ports are generated for multiple viewing, as illustrated in a typical output shown in FIGS. 6A, 6B, 6C and 6d. The top left view port, (FIG. 6A) shows a 3D view of the drawing. The top right view port, (FIG. 6B) shows the top view of the drawing while front and side views are shown on the bottom right (FIG. 6C) and left (FIG. 6D) view ports, respectively. The view port format can be changed by the user by using built-in display functions.

An "info function" allows the user to pick two cubes and obtain information concerning the movement of the manipulator over a period of time. The information is displayed on four windows, defined in the two dimensional screen, as shown in FIGS. 7A, 7B, 7C and 7D. The following parameters are produced to completely describe the manipulator movement: the three-dimensional coordinates of the end effector, the change in coordinate values, and the rate of change of the vector components. When the user picks two blocks using the "info function," the program retrieves the attribute information for each block and calculates the three-dimensional format shown in FIGS. 6A, 6B, 6C and 6D, and the output data is displayed. A hard copy of the output values can be produced.

A "done function" is used to switch from the two-dimensional output screen to the view ports screen. This function erases the output information and returns to the three-dimensional screen. Using this function, two new cube blocks defining new positions of the end effector can then be selected for analysis.

Figure 8:
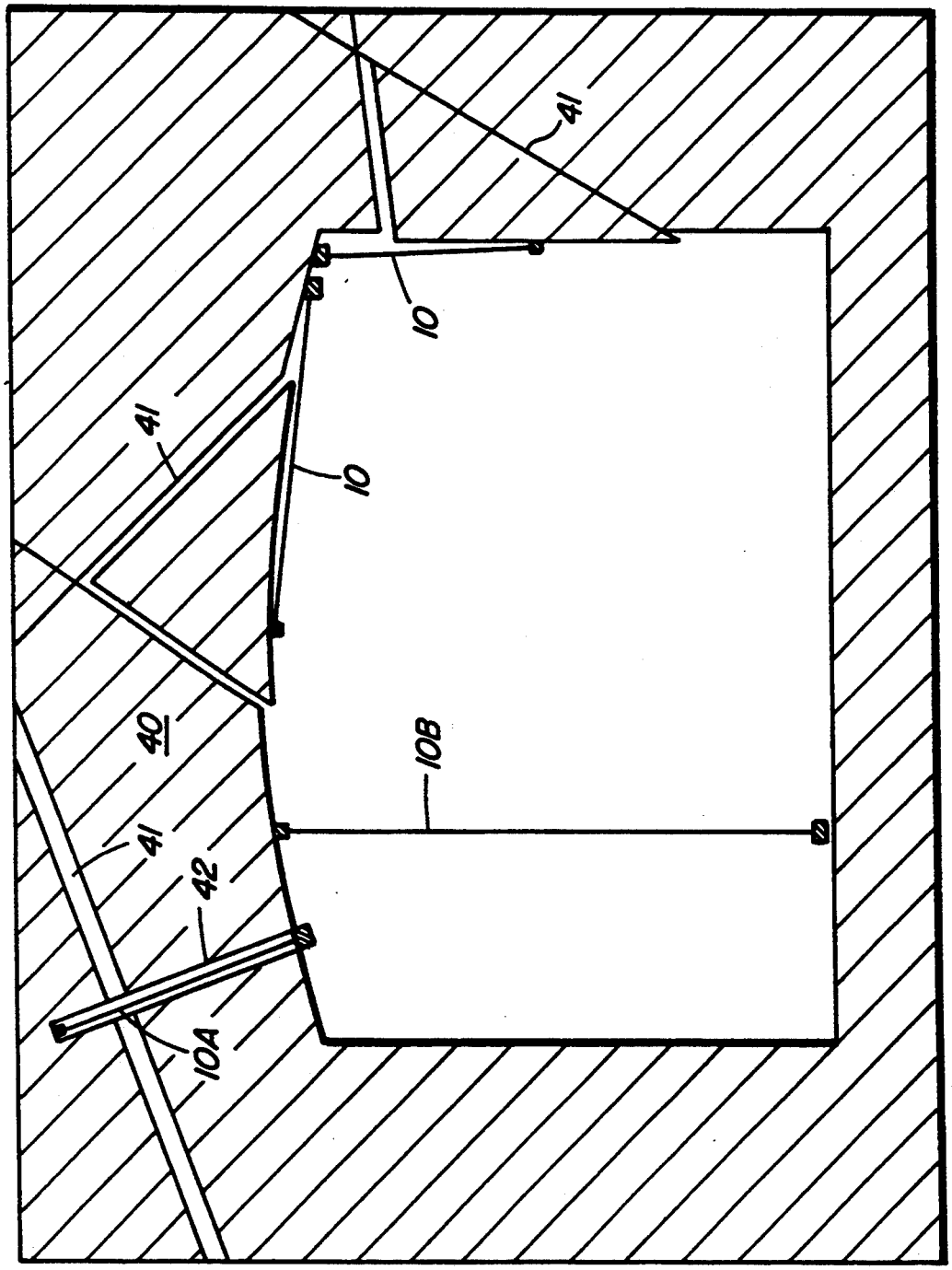
FIG. 8 is a cross-section of a rock tunnel showing how the apparatus of the invention may be used in practice.

FIG. 8 shows a representation of a tunnel through a rock burden 40 containing cracks or fissures 41. Apparatus 10 according to the invention may be positioned across detectable cracks or fissures, or may be used as a three-dimensional extensometer within bores 42 in the rock structure, as indicated at 10A, or directly between the floor and ceiling of the rock tunnel as indicated at 10B, in the manner shown, in order to keep track of movement or slippage within the rock structure. The means of anchoring the rod and the housing to the respective rock surfaces may differ slightly from the embodiment shown in FIGS. 1 and 2 when the apparatus is positioned within a bore or between a floor and ceiling of a tunnel, as will be readily appreciated by persons skilled in the art from the drawings.

Since the apparatus of the invention measures relative movement between the rod and housing in three dimensions, a single device of this kind can accurately measure three dimensional relative rock movements and provide a clear indication of the rock slippage or the like actually taking place.

The apparatus may be used to measure the response of a rock structure to an event, e.g., mining, blasting, seismic activity, etc., in three dimensions and permits timely remedial action when abnormal behaviour occurs. Moreover, apparatus may be retrieved and used elsewhere, which is an advantage over many known sensor devices that must be mounted permanently for proper operation.

I claim:

1. An for detecting movement in geological formations and other massive structures, which comprises a support, a rod made of a stiff material pivotally and slidably connected to said support at one end permitting longitudinal extension and rotation of said rod in three dimensions relative to the support, said rod having a second end remote from the support, first sensing means for sensing movement of said second end of said rod in an axial direction of said rod relative to said support, second sensing means for sensing rotational movement of said rod about said first end in a first plane, and third sensing means for sensing rotation of said rod about said first end in a second plane that intersects said first plane substantially at right angles, said first, second and third sensing means generating signals which, in combination, indicate a position of said second end of said rod relative to said support at a given time.

2. The apparatus of claim 1 wherein said first sensing means comprises a linear potentiometer.

3. The apparatus of claim 1 wherein said second and third sensing means both comprise rotary potentiometers.

4. The apparatus of claim 1 wherein said sensing means are contained with a housing acting as said support.

5. The apparatus of claim 4 wherein said second end of said rod and said housing are each provided with anchor means for attachment to remote supporting surfaces.

6. The apparatus of claim 1 wherein said first, second and third sensing means generate electrical signals and wherein said apparatus includes means for determining a spatial position of said second end of said rod from said signals.

7. The apparatus of claim 6 said means for determining said spatial position comprises electronic computing means and an output device for displaying said spatial position.

8. The apparatus of claim 1 including means to measure movement in said formations, from said signals generated by said first, second and third sensing means.

9. A method of detecting/measuring movement in geological formations and other massive structures, which comprises:

attaching a first end of a rod made of a stiff material to one part of said structure via a pivot mechanism and attaching a second end of said rod to another part of said structure remote from said one part, said pivot mechanism allowing for extension of said rod and pivoting of said second end about said first end in three dimensions;

sensing linear movement of said rod axially thereof, rotation of said rod in a first plane and rotation of said rod in a second plane substantially at right angles to said first plane, and generating signals corresponding to said sensed movements; and calculating said position of said second end relative to said pivot mechanism from said generated signals at different times in order to detect and/or measure movements of said second end relative to said first end over time.

10. The method of claim 9 wherein said calculation is performed by electronic computing means.

11. The method of claim 9 including the step of measuring movement in said formations from said generated signals at different times.

* * * * *